Oct. 11, 1960 H. D. HUME 2,955,813
BALANCE CONTROL FOR PUSH TYPE HARVESTERS
Filed Dec. 3, 1957 3 Sheets-Sheet 1
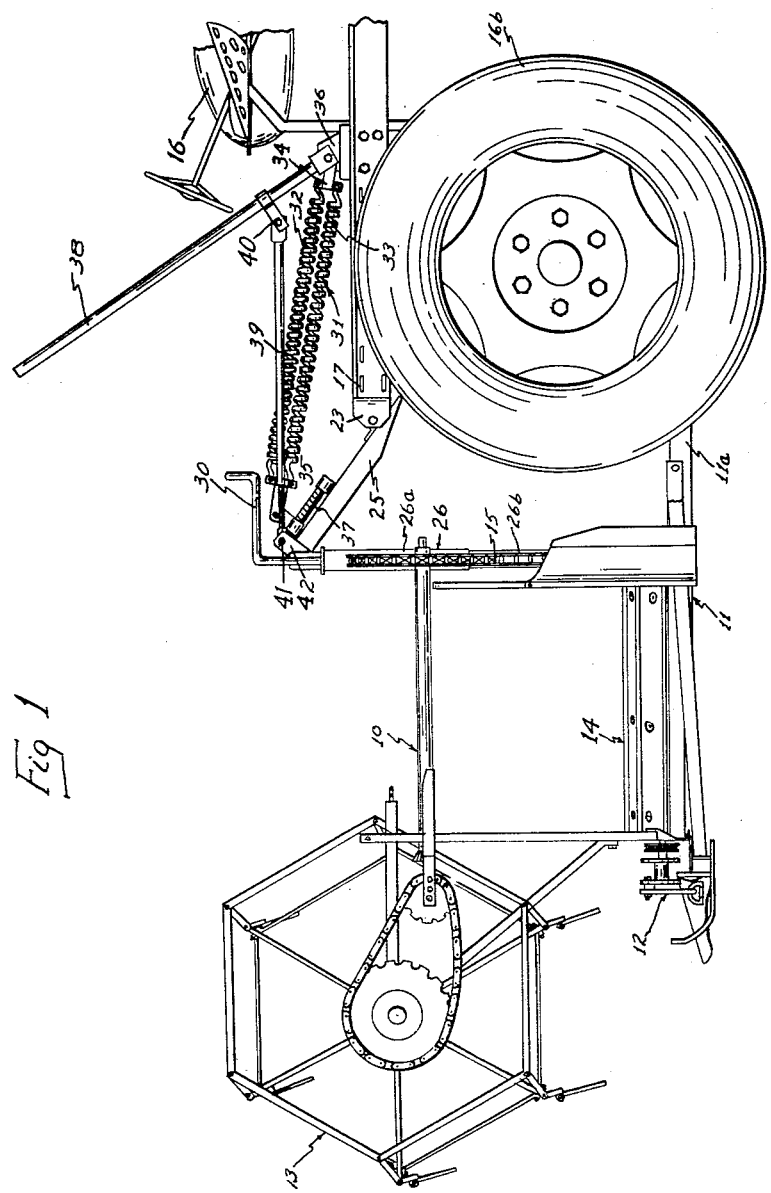
INVENTOR.
HORACE D. HUME
BY
Atty.

Oct. 11, 1960          H. D. HUME          2,955,813
BALANCE CONTROL FOR PUSH TYPE HARVESTERS
Filed Dec. 3, 1957          3 Sheets-Sheet 2
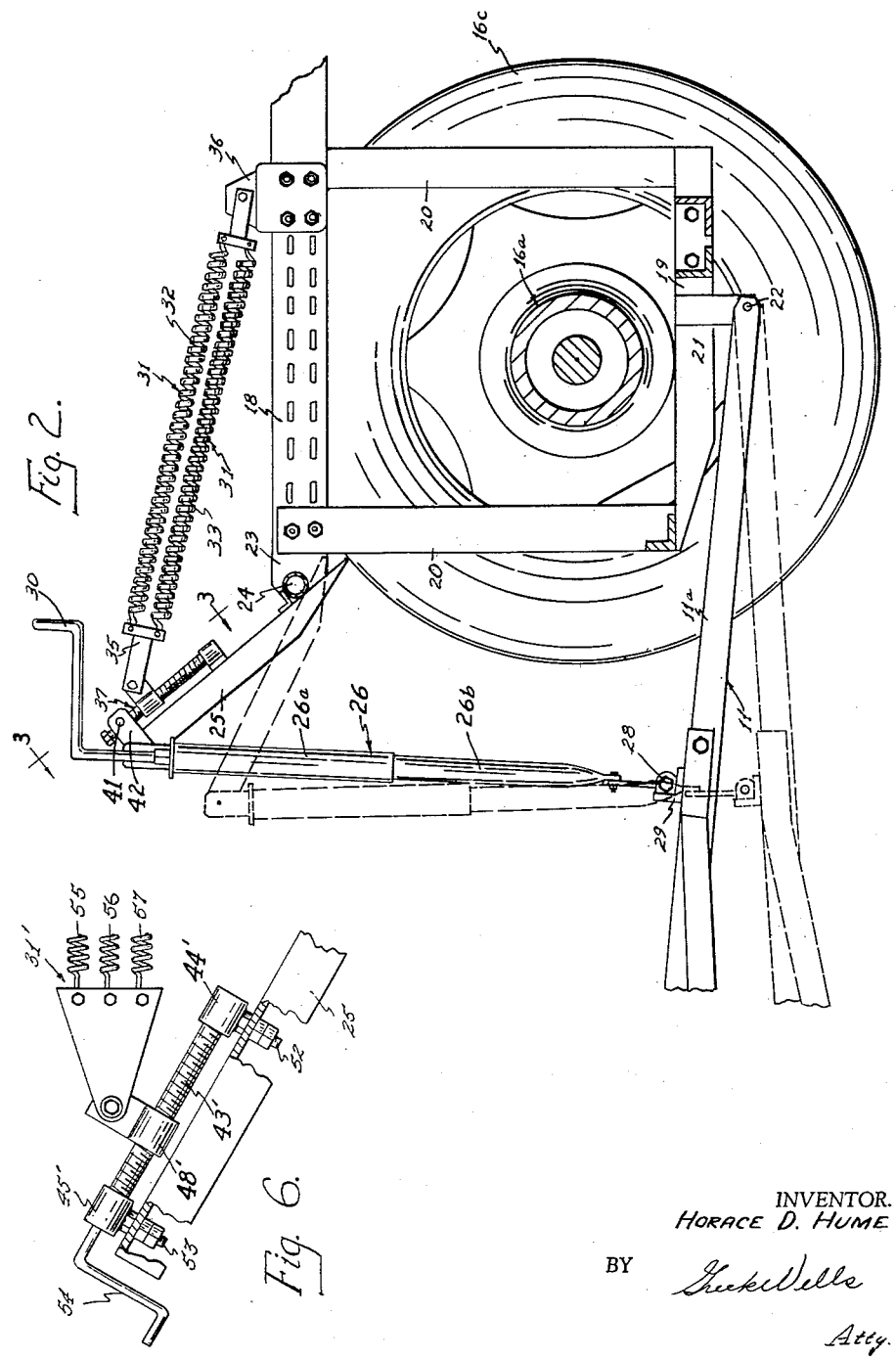
INVENTOR.
HORACE D. HUME

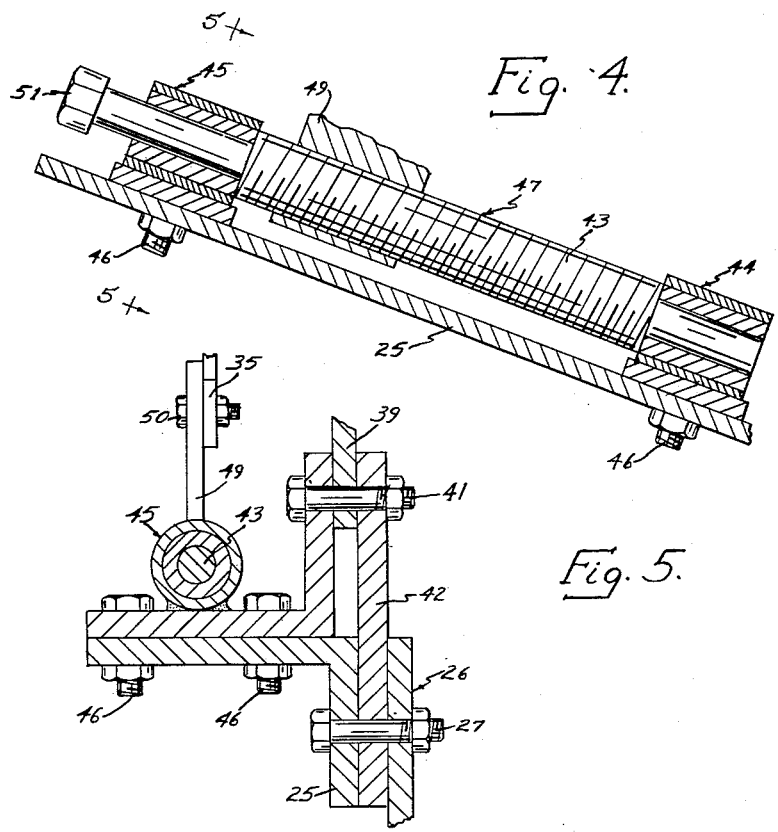
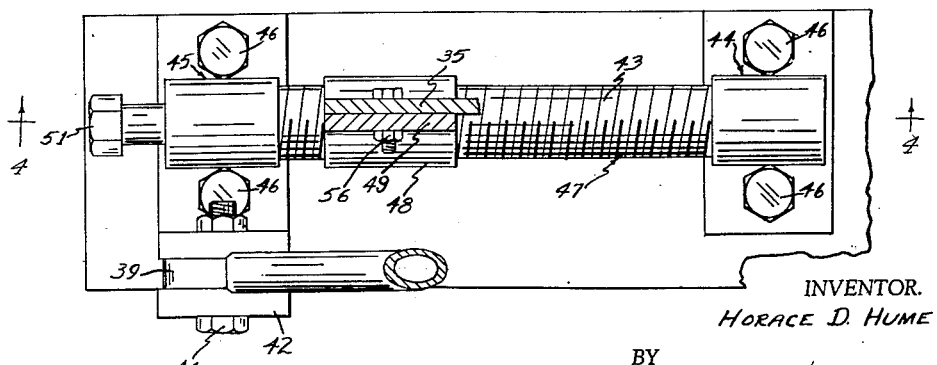

United States Patent Office 2,955,813
Patented Oct. 11, 1960

2,955,813

BALANCE CONTROL FOR PUSH TYPE HARVESTERS

Horace D. Hume, Mendota, Ill.

Filed Dec. 3, 1957, Ser. No. 700,316

2 Claims. (Cl. 267—1)

The present invention relates to improvements in harvester support mechanisms, and more particularly to a novel means for supporting and balancing a push type harvester from a tractor or other carrying vehicle.

In my prior patents, Patent No. 2,413,873, granted January 7, 1947, and Patent No. 2,603,054, granted July 15, 1952, I have disclosed a cutting and windrowing mechanism adapted to be mounted to a tractor or other carrying vehicle in such a manner as to be pushed in the field ahead of the tractor to cut and windrow the crops therein. As pointed out in these patents, a machine of this character is to be desired over the standard pull type machines for the reason that the carrying vehicle follows the cutting mechanism and thus avoids the considerable losses due to crushing and flattening of the crop which accompany the use of pull type harvesters. Harvesters of the type disclosed in the above mentioned patents also enjoy the advantage of being carried entirely by the powered vehicle therebehind in such a manner as to be vertically adjustable with respect to the carrying vehicle to conform closely to ground contour and crop height. This construction permits the most efficient harvesting of short or low lying crops.

In order to provide for the best operation of a push type harvester of this character, it is necessary that the cutting mechanism be supported from the carrying vehicle in such a fashion that it is able to "float" over the ground. That is to say, the cutting mechanism must be mounted to the carrying vehicle for vertical movement, and must be accurately counterbalanced from the vehicle so as to be substantially weightless to permit quick and accurate response to changes in ground contour either through action of the operator to raise and lower the mechanism, or through ground engagement.

In my prior Patent No. 2,603,054, mentioned above, I have disclosed a harvester support mechanism which is capable of maintaining the harvesting machinery in a floating condition while operating at high and low cutting levels. This mechanism comprises, essentially, a harvesting machinery supporting frame pivoted to the carrying vehicle and extending forwardly therefrom.

Counterbalancing means are provided between the frame and the vehicle to counterbalance the weight of the machinery and the frame and render the frame substantially weightless whereby to permit it to float in front of the carrying vehicle. The counterbalancing means comprises a lever or levers pivoted to the carrying vehicle above the harvester supporting frame, link means connecting the lever to the harvester supporting frame in front of its pivotal connection to the carrying vehicle, and spring counterbalancing means connected between the lever and the carrying vehicle operable to balance the force exerted on the lever through the connecting link means which represents the weight of the harvesting machinery on the supporting frame.

A supporting mechanism of this character performs its function very well provided, of course, that the proper counterbalancing force is exerted by the spring counterbalancing means. A delicate balance is necessary to the most efficient operation of the mechanism. Since under various field conditions, the weight force exerted by the harvesting machinery through the connecting link means may be changed, as for example would be the case when the harvester reel is adjusted forwardly or rearwardly with respect to the cutting mechanism, or when a particularly heavy or light crop is being harvested, it is necessary to provide means for adjusting the counterbalancing force to compensate for weight changes. Accordingly, it is the principal purpose of this invention to provide in a supporting mechanism of the type described, novel means for accurately adjusting the counterbalancing force exerted upon the harvesting machinery.

More specifically, it is the purpose of this invention to provide simple and easily operated means for adjusting both the tension in the counterbalancing spring means and the leverage enjoyed by the spring means whereby to accurately adjust the counterbalancing force.

The exact nature and advantages of my invention will appear more clearly from the following description and the accompanying drawings wherein a preferred form of the invention is shown. It should be understood, however, that the description and drawings are illustrative only, and are not intended to limit the invention except insofar as it is limited by the claims.

In the drawings:

Figure 1 is an elevational view of a pusher type harvester supported upon a powered vehicle by supporting means embodying my invention;

Figure 2 is an enlarged fragmentary vertical longitudinal view of the support mechanism illustrated in Figure 1;

Figure 3 is an enlarged fragmentary plan view of my improved balance adjustment means looking in the direction of the arrows 3—3 of Figure 2;

Figure 4 is a fragmentary sectional view taken on the line 4—4 of Figure 3;

Figure 5 is a fragmentary sectional view taken on the line 5—5 of Figure 4; and

Figure 6 is a fragmentary elevational view of one of the balance adjusting means showing a modified form of the invention.

Referring now to the drawings, and to Figures 1 and 2 in particular, I have shown my invention in combination with the cutting and windrowing harvester, generally indicated by the numeral 10, which comprises a main frame 11 having supported thereon a cutting mechanism 12, a reel 13, and a transverse windrow forming draper 14. The elements 12, 13, and 14 are driven through drive means partially indicated at 15 from a power take off (not shown) of a tractor 16 upon which the harvester 10 is supported. The details of construction of the harvester 10 and the drive means 13 are not disclosed herein since the mechanism is old and well known in the art.

It will be observed that in the drawings, the harvester 10 is shown as mounted to that end of the tractor 16 normally designated as the rear end. However, since the harvester 10 is intended to be advanced through the field ahead of the tractor 16, and the tractor 16 is thus operated in reverse, the end of the tractor to which the harvester 10 is mounted will hereinafter be referred to as the front end. The terms "forward," "forwardly," and "front" as used herein are intended to indicate the end of the tractor to which the harvester 10 is mounted.

The means of supporting the harvester 10 on the tractor 16 are best shown in Figure 2. As illustrated a pair of beams 17 and 18 are rigidly fixed on the tractor 16 in position to extend forwardly over the axle unit 16a thereof and between the tractor wheels 16b and 16c. The particular manner of affixing the beams 17 and 18 to the body of the tractor 16 is not illustrated since it may vary widely, depending upon the construction of the particular tractor utilized. Suffice it to say that the beams 17 and 18 are secured in accordance with customary mechanical practices.

A sub frame 19 is positioned beneath the axle unit 16a of the tractor 16 below the forward ends of the beams 17 and 18. The sub frame 19 is suspended from the beams 17 and 18 by vertical frame members 20. The sub frame 19 provides means for pivotally mounting the harvester frame 11 to the tractor 16, and to this end a pair of depending ears 21 are fixed to the frame 19 in transversely spaced relation. The ears 21 have pivot means 22 thereon at their lower ends to which arm members 11a are pivoted. The arm members 11a are rearward extensions of the frame 11. In this manner the frame 11 is mounted to the front of the tractor 16 for free vertical pivotal movement about the pivot means 22.

In order to support the frame 11 on the tractor 16 for substantially weightless floating movement about the pivot means 22, spring counterbalancing means are provided. As illustrated in Figure 2 each of the beams 17 and 18 is provided at its forward end with a bracket 23. A rock shaft 24 is journalled between the brackets 23. The rock shaft 24 has thereon a pair of spaced apart radially extending arms 25 that extend forwardly and upwardly above the frame 11. The arms 25 have depending links 26 connected to their outer ends by pivot pins 27. The links 26 are connected at their lower ends by pivot pins 28 to brackets 29 which are supported on the frame 11. The links 26 thus form link means connecting the front ends of the arms 25 to the frame 11. The links 26 are formed of upper and lower telescoping sections 26a and 26b and are adjustable in length by operation of cranks 30 provided at their upper ends. Counterbalancing spring assemblies generally indicated at 31 in the drawings are provided between the outer ends of the arms and the beams 17 and 18. The spring assemblies 31 exert a force on the arms 25 which tends to pivot them upwardly and rearwardly. This force is transmitted through the links 26 as a lifting force on the frame 11 to counterbalance the weight of the harvester 10.

Each of the spring assemblies 31 comprises two coil springs 32 and 33, the ends of which are connected to brackets 34 and 35. The brackets 34 at the rearward ends of the springs 32 and 33 are pivoted to upstanding ears 36 bolted to the beams 17 and 18 at points spaced rearwardly from the rock shaft 24. The brackets 35 at the forward ends of the springs 32 and 33 are connected, through balance adjusting devices 37, to the lever arms 25.

To provide for operator control of the cutting height, a control lever 38 is provided on the tractor 16. As illustrated in Figure 1 the lever 38 is pivoted to one of the brackets 36 which ties the rear ends of the spring assemblies to the beams 17 and 18. A link 39 is pivoted to the lever 38 intermediate its ends, as shown at 40. The link 39 extends forwardly to the free end of one of the arms 25, and is there connected by a pin 41 to bracket means 42 provided on the arm 25. It will be seen that by movement of the control lever 38, the operator of the harvester 10 can raise it and lower it as desired. Since the weight of the harvester 10 is effectively cancelled by the counterbalance means, the operator need only exert slight pressure on the control lever 38 to effect the height adjustment.

Floating action of the harvester 10 is obtained by adjustment of the counterbalancing force of the spring assemblies 31 to match the weight of the mechanism on the frame 11. This adjustment may be accomplished by variation of the tension of the spring assemblies through adjustment of their lengths. It may also be accomplished by variation of the leverage enjoyed by the spring assemblies 31 with respect to the arm 25, through adjustment of the distance from the rock shaft 24 to where the spring assemblies 31 are connected to the arms 25. It is the purpose of my invention to utilize both of these methods of adjustment to obtain extremely delicate and accurate counterbalancing. Accordingly, the balance adjustment devices mounted on the arms 25 are operable to change both the tension of the spring assemblies 31 and the distance from the rock shaft 24 at which the spring assemblies 31 are connected to the arms 25. The construction of the balance adjustment devices 37 is best shown in Figures 3, 4 and 5. As illustrated in these figures each device 37 comprises a shaft 43 which extends parallel to the adjacent arm 25, and which is rotatably but non-slidably journalled in end bearings 44 and 45 bolted to the adjacent arm 25 by bolts 46. As illustrated in Figure 4, each shaft 43 has thereon an enlarged threaded portion 47 positioned between the end bearings 44 and 45. A collar 48 is threaded upon the portion 47 for each shaft 43 between the bearings 44 and 45. The collar 48 carries an upstanding ear 49 to which the forward bracket 35 of the adjacent spring assembly 31 is pivoted by means of a pivot pin 50. It will be appreciated that by rotation of the shafts 43 within their bearings 44 and 45 the collars 48 may be moved lengthwise along the threaded portions 47 of the shafts 43 between bearings 44 and 45. Since the brackets 35 of the spring assemblies 31 are pivoted to the ears 49 carried by the collar 48, this movement results in adjustment of the points at which the spring assemblies 31 are connected to the arms 25. Movement of the collars 48 toward the rock shaft 24 will move the points of connection of the spring assemblies 31 toward the rock shaft 24 and thus decrease the leverage enjoyed by the spring assemblies 31. Movement of the collars 48 away from the rock shaft 24 will increase the leverage enjoyed by the spring assemblies 31. In addition to the adjustment of the leverage enjoyed by the spring assemblies 31, movement of the collars 48 will also vary a distance between the brackets 34 and 35 of the spring assemblies 31 and thus lengthen the springs 32 and 33 and thereby vary their tension. In order to rotate the shafts 43 and thus adjust the tension and leverage of the spring assemblies 31, the shafts 43 are extended outwardly a short distance beyond the bearings 45 and are provided with wrench receiving heads 51. By turning the shafts 43 by means of a wrench or similar tool applied to the heads 51, the operator of the harvester can adjust the tension and leverage of the spring assemblies 31 to obtain very delicate and accurate balancing of the harvester 10 for any existing conditions. Since this balancing requires only the simple manipulation of the two heads 51, it may be carried out quickly and efficiently at any time and without the use of expensive or cumbersome tools.

I do not intend to limit my invention to the particular construction illustrated in Figures 2–5, for it is obvious that certain changes in construction may be made without departing from the spirit of the invention. In Figure 6 I have shown a modified form of the invention wherein certain changes of an engineering nature have been made. As illustrated, the balance adjustment device 31' comprises a shaft 43' journalled in end bearings 44' and 45' as in the main form of the invention. In this form of the invention, however, the end bearings 44' and 45' are welded directly to the heads of bolts 52 and 53 and are secured to the arms 25 by the bolts 52 and 53. It will be appreciated that this construction provides the same result as the construction shown in Figures 2–5. In Figure 6 I have shown a crank handle 54 on the end of the shaft 43' instead of the wrench receiving head 51, to facilitate adjustment of the device 31'.

I have shown, in Figure 6 a spring assembly 31' which comprises three coil springs 55, 56, and 57 in place of the two springs 32 and 33 shown in Figures 1 and 2. It will be understood, of course, that any number of springs may be used, depending upon the tension desired.

It is believed that the nature and advantages of my invention appear from the foregoing.

Having thus described my invention, I claim:

1. An adjustable counterbalance support for a movable load carried by a supporting frame, comprising an arm pivoted at one end to the supporting frame, means connecting the remaining end of said arm to the load, spring counterbalancing means connected between said arm and the supporting frame adapted to oppose the force exerted by the load upon said arm, said spring counterbalancing means being connected to said arm by adjustable connecting means including a movable spring connection member connected to said spring counterbalancing means, mounting means on said arm mounting said spring connection member thereto for controlled movement endwise of said arm toward and away from the pivotal connection between said arm and said supporting frame and means carried by said mounting means operable to move said spring connection member on said mounting means.

2. An adjustable counterbalance support for a movable load carried by a supporting frame, comprising an arm pivoted at one end to the supporting frame, means connecting the remaining end of said arm to the load, spring counterbalancing means connected between said arm and the supporting frame adapted to oppose the force exerted by the load upon said arm, said spring counterbalancing means being connected to said arm by adjustable connecting means including a threaded shaft, bearings mounted on said arm adapted to support said shaft in a position with its axis extending longitudinally of the arm, a collar threaded on said shaft, said spring counterbalancing means being connected to said collar, and means on the shaft by which the shaft may be rotated to thereby move said collar axially along the shaft toward and away from the end of said arm that is pivoted to the supporting frame.

References Cited in the file of this patent

UNITED STATES PATENTS

| | | |
|---|---|---|
| 2,413,873 | Hume | Jan. 7, 1947 |
| 2,509,357 | Krause | May 30, 1950 |
| 2,709,057 | Gould | May 24, 1955 |